United States Patent [19]

Pitre

[11] Patent Number: 5,743,678
[45] Date of Patent: Apr. 28, 1998

[54] ANCHOR EYE-BOLT FOR MINE ROOF

[75] Inventor: Gerald J. Pitre, Bathurst, Canada

[73] Assignee: Bathurst Machine Shop Ltd., Bathurst, Canada

[21] Appl. No.: 650,371

[22] Filed: May 20, 1996

[51] Int. Cl.$^6$ .................... E02D 21/00; F16B 31/00
[52] U.S. Cl. .................... 405/259.1; 405/302.1; 411/400
[58] Field of Search ............. 405/259.1, 302.2, 405/302.1, 302.3; 411/400

[56] References Cited

U.S. PATENT DOCUMENTS

| | | | |
|---|---|---|---|
| 1,526,358 | 2/1925 | Mechling | 405/259.1 X |
| 3,163,012 | 12/1964 | Dempsey | 405/302.2 |
| 4,601,616 | 7/1986 | Barish et al. | 405/302.2 X |
| 4,934,873 | 6/1990 | Calandra | 405/259.1 X |
| 4,946,315 | 8/1990 | Chugh et al. | 405/302.2 X |
| 4,958,796 | 9/1990 | Bernosky | 405/259.1 X |
| 5,087,160 | 2/1992 | Pezzutto | 405/259.1 X |
| 5,183,360 | 2/1993 | Freeman | 411/400 |

FOREIGN PATENT DOCUMENTS

| | | | |
|---|---|---|---|
| 990985 | 6/1976 | Canada | 85/4 |
| 2104143 | 8/1993 | Canada | E21D 15/00 |
| 2526501 | 11/1983 | France | 411/400 |
| 2245673 | 1/1992 | United Kingdom | 411/400 |

Primary Examiner—Dennis L. Taylor
Attorney, Agent, or Firm—Mario D. Theriault

[57] ABSTRACT

An anchor eye-bolt for use in strengthening a mine roof as well as for supporting mine installation below the roof. The anchor eye-bolt of the present invention comprises broadly an elongated stem having on a first end thereof a threaded portion for engaging into an expansion-type anchor shell, and a polygonal bolt head forming a second end thereof. The polygonal bolt head comprises a circular pressure bearing surface on a first side thereof adjoining the stem, and an eyed projection extending from a top surface thereof. The circular pressure bearing surface preferably has a diameter as large as an across-corner dimension of the polygonal bolt head. The eyed projection preferably has a width similar to an across-flat dimension of the polygonal bolt head. A thickness of the eyed projection is preferably substantially a same dimension as a diameter of the stem. In another aspect of the anchor eye-bolt of the present invention, there is provided a tension washer used in combination with that anchor eye-bolt. The tension washer mounts on the anchor eye-bolt against the pressure bearing surface of the polygonal bolt head. The tension washer has a bent portion and a hole through that bent portion for receiving an attachment of a cord member used in strengthening a mine roof.

6 Claims, 5 Drawing Sheets

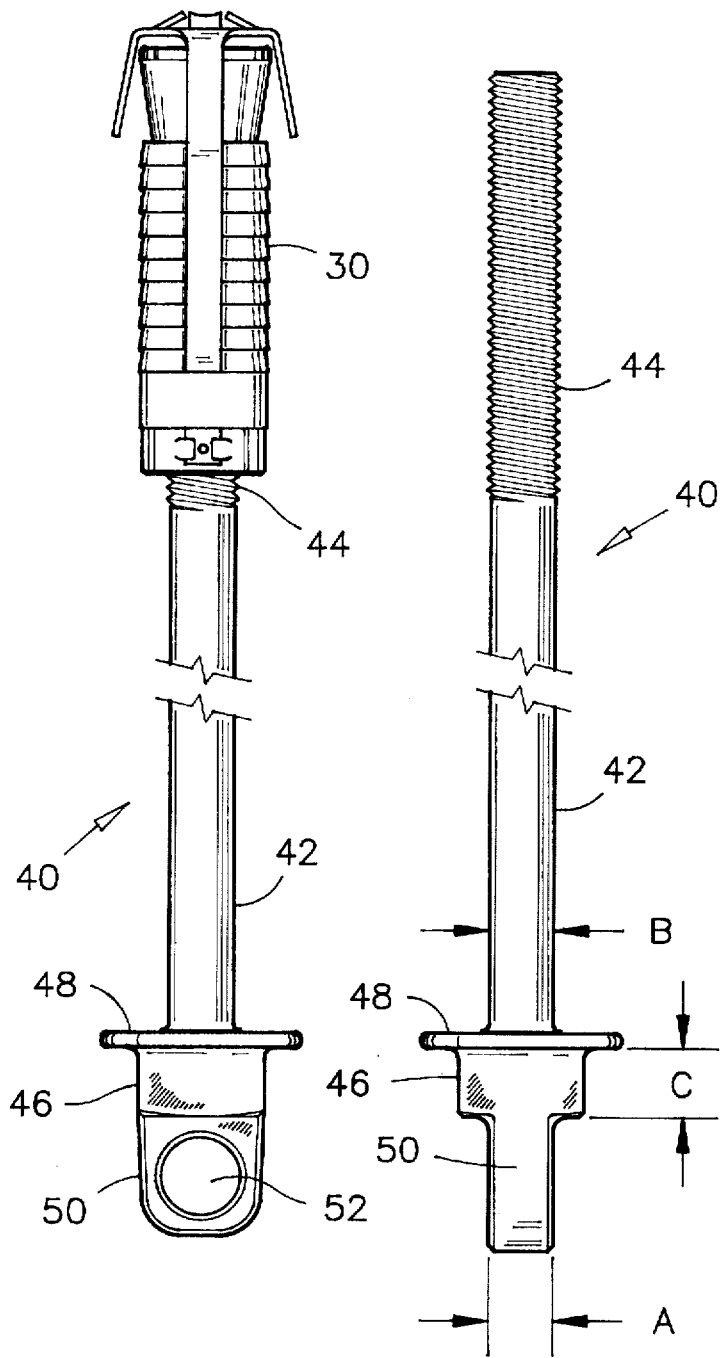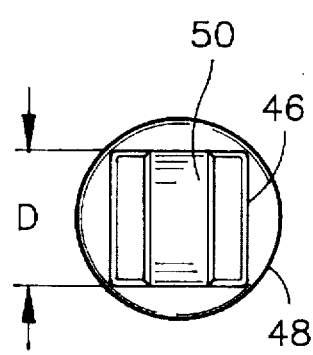
FIG. 4
FIG. 5
FIG. 6

ANCHOR EYE-BOLT FOR MINE ROOF

FIELD OF THE INVENTION

The present invention relates to mine roof anchor bolts. More particularly, the present invention relates to anchor eye-bolts for use in compressing the rock formation of a mine roof.

BACKGROUND OF THE INVENTION

A first type of rock bolts used in mines is used to strengthen a mine roof and to prevent caving of the roof. A mine roof strata is known to be composed of various layers of different types of rock having varying strength characteristics. An array of spaced apart mine roof bolts is generally installed in the mine roof to secure the various layers of the mine roof strata together.

A rock bolt is generally several feet long. During installation of the bolt, the stiffness of the bolt is usually increased by tightening it to a predetermined torque. Each bolt compresses the layers of rock to prevent slippage therebetween, and increases thereby the strength of the laminated strata.

Typical rock bolts of the prior art are illustrated in U.S. Pat. No. 4,437,795, issued on Mar. 20, 1984 to Claude C. White, and in U.S. Pat. No. 5,018,908, issued on May 28, 1991 to Gary Laphon. The anchor bolts described therein comprise a polygonal head with a pressure bearing surface, and a stem having a threaded portion engaging into an expansion type anchor shell.

A second type of roof bolts used in mines has an eye-bolt type head forged on the end of a concrete rebar. These bolts are used in pair, spaced apart from one-another with a tension member therebetween. The tension member or horizontal chord extends across the mine roof between the eye-bolt anchors to generate an upward force on the roof, to provide stability to the roof. This type of eye-bolt is disclosed in U.S. Pat. No. 4,934,873, issued on Jun. 19, 1990 to Frank Calandra Jr.

Other types of eye-bolts are used as roof bolts to support wire mesh screen against the wall of a mine tunnel. Examples of these mesh supporting eye-bolts are disclosed in U.S. Pat. No. 3,455,200 issued on Jul. 15, 1969 to James D. Cumming. This type of rock bolt has a s into the shape of a loop which is dimensioned for retaining a cross pin. The cross pin is used to wedge a wire mesh against a wall of the mine tunnel.

Eye-bolts are also used in mines to support ventilation ducts, electrical and communication cables, pneumatic hoses and conduits of the like. These eye-bolts and J-hook bolts are known in the mining industry. Typical examples of eye-bolts and hook bolts of the prior art are illustrated in FIGS. 2 and 3 enclosed herein for reference purposes.

A more recent method for supporting conductors, hoses and ducts in a mine tunnel is described in U.S. Pat. No. 5,222,837, issued on Jun. 29, 1993 to Connie L. Phillips. This invention is about a clamp and a eye-bolt which can be adjustably positioned close to a sidewall of the mine. The clamps are mounted on channels which are attached to the mine roof.

The different types of eye-bolts of the prior art do not have a pressure bearing surface in combination with a polygonal head, for applying torque to the bolt and for maintaining the bolt under tension. Thus the eye-bolts of the prior art can hardly be used to apply a direct compressive force to a laminated strata.

Another inconvenience with the eye-bolts of the prior art is that their installation requires the drilling of a hole and the expanding of an anchor shell in that hole prior to installing the eye-bolt. The usual method for expanding an anchor shell in a bored hole is to drive it in place with a regular type rock bolt. When the shell is properly expanded and anchored, the regular bolt is removed and replaced with an eye-bolt.

The function of an eye-bolt of the prior art is thereby limited to supporting tension chords, mine installations and equipment below the roof. Furthermore, the rock formation around an eye-bolt is not compressed by the bolt, but is rather subject to an adverse downward loading.

SUMMARY OF THE INVENTION

In the present invention, however, there is provided an anchor eye-bolt for use in strengthening a mine roof as well as for supporting mine installation. The anchor eye-bolt of the present invention comprises broadly an elongated stem having on a first end a threaded portion for engaging into an expansion type anchor shell, and on a second end a bolt head. The bolt head has a circular pressure bearing surface on a first side thereof adjoining the stem, and an eyed projection extending away from the stem. Hence, the stem of the anchor eye-bolt of the present invention can be stiffened through the mine roof while the eyed projection is optionally used to support mine installation.

A first advantage of this aspect of the present invention is that one type of bolt is used throughout the mine roof reinforcing array of bolts, wherein every other anchor eye-bolt here and there is used to support mechanical installation. A second advantage of the anchor eye-bolt of the present invention is that an anchor eye-bolt supporting a mechanical installation is prestressed to strengthen the mine roof about the bolt.

In accordance to another aspect of the present invention, a maximum width of the eyed projection is similar to an across-flat dimension of the bolt head. Therefore, during installation of the anchor eye-bolt of the present invention through a mine roof, a driving socket of a mine power tool is in contact with all flats and the eyed projection of the bolt head, affording an effective and a convenient installation of the anchor eye-bolt.

In accordance to yet another aspect of the present invention the eyed projection is a generally rectangular box-like projection having a thickness substantially a same dimension as a diameter of the stem of the bolt. Therefore the eyed projection, bolt head and circular pressure bearing surface of the anchor eye-bolt of the present invention are integrally formed by a single upsetting metal forming process. The press-time cost for manufacturing the anchor eye-bolt of the present invention is thereby relatively similar to the press-time cost for manufacturing a common rock bolt of the prior art. Hence, the anchor eye-bolt of the present invention is economically reasonably manufacturable.

In accordance to a further aspect of the anchor eye-bolt of the present invention, there is provided a tension washer used in combination with an anchor eye-bolt. The tension washer mounts on the anchor eye-bolt and rests against the pressure bearing surface of the bolt head. The tension washer has a bent portion and a hole through that bent portion for receiving an attachment of a chord member used in strengthening a mine roof.

The anchor eye-bolt and tension washer arrangement thus described, when used in pair with a tension chord therebetween, provides the multiple functions of strengthening a mine roof by direct compression of the rock layers, of strengthening the roof by reactive support from the tension chord, and of supporting mechanical installation below the mine roof.

BRIEF DESCRIPTION OF THE DRAWINGS

The preferred embodiment of the invention will be further understood from the following description, with reference to the drawings in which:

FIG. 4 illustrates a first side view of an anchor eye-bolt of a first preferred embodiment, with an expansion-type anchor shell;

FIG. 5 is a second side view of an anchor eye-bolt of a first embodiment;

FIG. 6 is an end view of a bolt head of the anchor eye-bolt of the first preferred embodiment;

DETAILED DESCRIPTION OF THE PREFERRED EMBODIMENT

Figures 1, 2, 3:
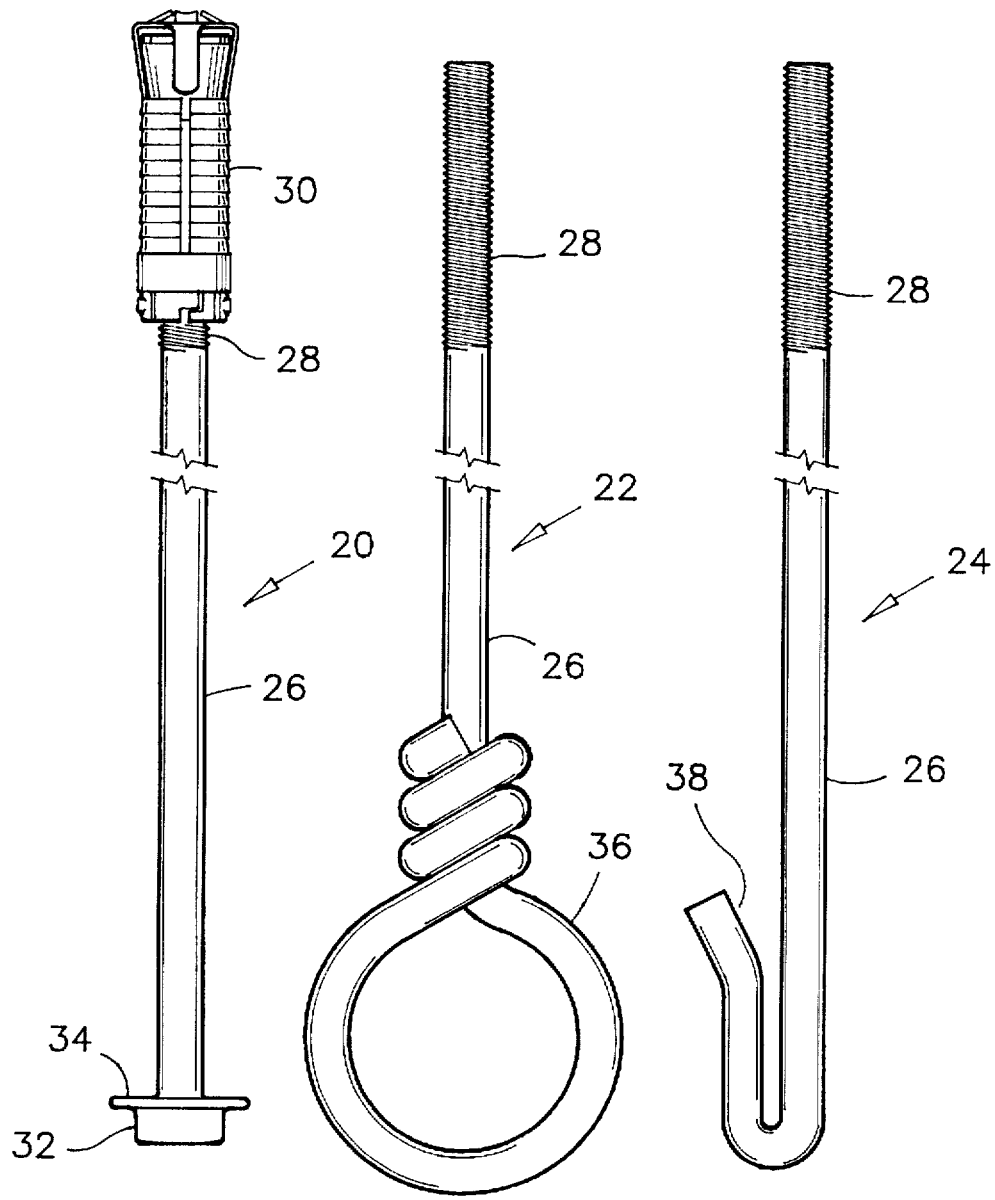
FIG. 1 illustrates a typical rock bolt of the prior art.
FIG. 2 is a side view of an eye-bolt of the prior art.
FIG. 3 is a side view of a J-hook bolt of the prior art.

In FIGS. 1, 2 and 3, there is illustrated for reference purposes only, a typical rock bolt 20, an eye-bolt 22 and J-hook bolt 24 of the prior art. Each bolt of the prior art 20, 22 or 24 comprises a stem 26 and a threaded portion 28 connectable into an expansion-type anchor shell 30. A rock bolt 20 of the prior art also comprises a polygonal head 32 formed on the end of the stem 26.

The rock bolt 20 generally also comprises a circular pressure bearing surface 34, adjacent to and integrally formed with the polygonal head 32, for increasing the compression bearing surface of the bolt head 32. The polygonal head 32 and disk 34 of these rock bolts 20 are normally formed on a mechanical press by an upsetting metal forming process.

The loop 36 of the eye-bolt 22 and the branch 38 of the J-hook bolt 22 of the prior art are generally forged on the stem, and do not have an enlarged compression bearing surface such as the disk portion 34 of a rock bolt 20.

Referring now to FIGS. 4, 5 and 6, the anchor eye-bolt 40 of a first preferred embodiment comprises a stem 42, a threaded portion 44 connectable into a conventional expansion-type anchor shell 30. The anchor eye-bolt 40 comprises also a polygonal head 46, having preferably a square shape, and a circular pressure bearing surface 48 integrally formed with the bolt head 46. The circular pressure bearing surface 48 has a diameter of at least an across-corner dimension of the bolt head 46.

The anchor eye-bolt 40 of the first preferred embodiment further has an eyed projection 50 extending from a top portion of the polygonal head 46. The eyed projection 50 has an aperture 52 for receiving a shackle, a tie wire, a cable or other type of fastening means (not shown) for supporting mechanical installation and mining equipment.

The anchor eye-bolt 40 of the first preferred embodiment is used as a rock bolt for strengthening the roof of a mine as well as an eye-bolt for supporting mechanical equipment in that mine. Moreover, when the anchor eye-bolt 40 is used for supporting mechanical equipment, the rock formation around that bolt is under compression from the bolt itself for preventing any loosening of the strata from a vibration of equipment being supported by that bolt for example.

The anchor eye-bolt 40 of the present invention provides a stiff connection to the rock formation of a mine roof while strengthening this rock formation. The anchor eye-bolt of the present invention 40 is thereby safer to use in a mine than conventional eye-bolts.

Other advantages of the anchor eye-bolt 40 of the present invention comprises the fact that it is used throughout the mine roof. Miners carry only one type of anchor bolts and the bolts are installed using torque wrenches equipped with a single common size drive socket. This is a commendable advantage over the installation of a conventional eye-bolt 22 where the anchor shell must be expanded in a bored hole prior to installing the eye-bolt 22 therein.

The eyed projection 50 of the anchor eye-bolt 40 of the first preferred embodiment is preferably a generally rectangular box-like projection having a maximum cross-section dimension, or width, similar to an across-flat dimension of polygonal bolt head 46. Furthermore the rectangular box-like projection of the first preferred embodiment has a thickness "A" which is at least as much as a diameter "B" of the stem 42. Accordingly, a bolt stock the size of the stem 42 can reach the bottom of an upsetting die such that the bolt head 46, the pressure bearing surface 48 and the eyed projection 50 are formed in a single hot electro-upsetting metal forming process. The aperture 52 is subsequently punched out or drilled through projection 50 using conventional machine tool.

The bolt head 46 of the first preferred embodiment is a square block having a thickness as indicated by label "C" of about 0.600", and a side dimension as indicated by label "D" of about 1.100". A maximum width of projection 50 is also about 1.100". All flats of the bolt head 46 thus formed has an effective engagement into a driving socket of a mine power tool, affording little slipping therefrom.

Figures 7, 8:
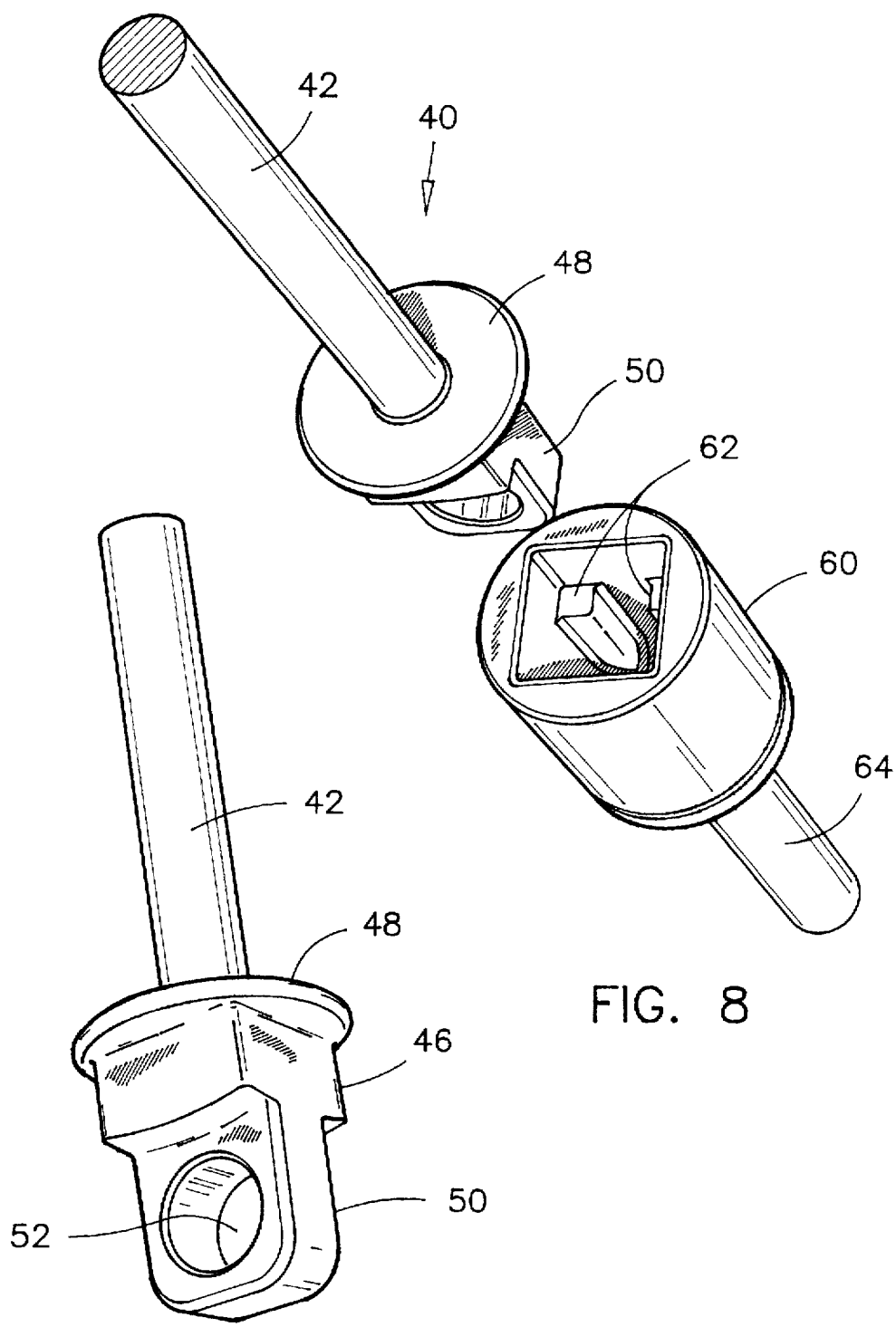
FIG. 7 is a perspective side view of the bolt head of the anchor eye-bolt of the first preferred embodiment.
FIG. 8 is a perspective side and upper end view of the bolt head of the anchor eye-bolt of the first preferred embodiment, and of a drive socket for driving the anchor eye-bolt of the present invention into a mine roof.

Referring now to FIGS. 7 and 8, a driving socket 60 of a mine power tool preferably has four shoulders 62 along the inside corners of the socket's cavity for acting upon the edges of projection 50 during rotation of the anchor eye-bolt 40. The four shoulders 62, two of which may be seen on FIG. 8, define a cross-like formation for receiving projection 50 in any orientation of bolt head 46 into socket 60.

Because of the large engagement of all flats of bolt head 46 and of the projection 50 into socket 60, the socket 60 is preferably dimensioned with a loose fit over the bolt head 46 and projection 50. Such a loose fit tolerates slight misalignments between the stem 42 and the driving arbour 64 of socket 60, and facilitates the installation of the anchor eye-bolt 40 of the present invention.

Furthermore, the engagement of the projection 50 into the socket 60 helps to retain the anchor eye-bolt 40 into socket 60 even when an alignment of socket 60 is tilted near an horizontal line. Accordingly, the anchor eye-bolt 40 of the present invention is easier to handle and to install in a mine roof than a rock bolt 20 of the prior art having a relatively small engagement into a driving socket of a mine power tool.

It is yet another advantage of a large engagement of all flats of the bolt head 46 into the socket 60, that a torque from the socket 60 during the installation of the anchor eye-bolt 40 is applied directly to the stem of the anchor eye-bolt, preventing thereby any bending or being applied to being applied to the eyed projection 50, and any deformation to the eyed projection resulting therefrom.

Figure 9:
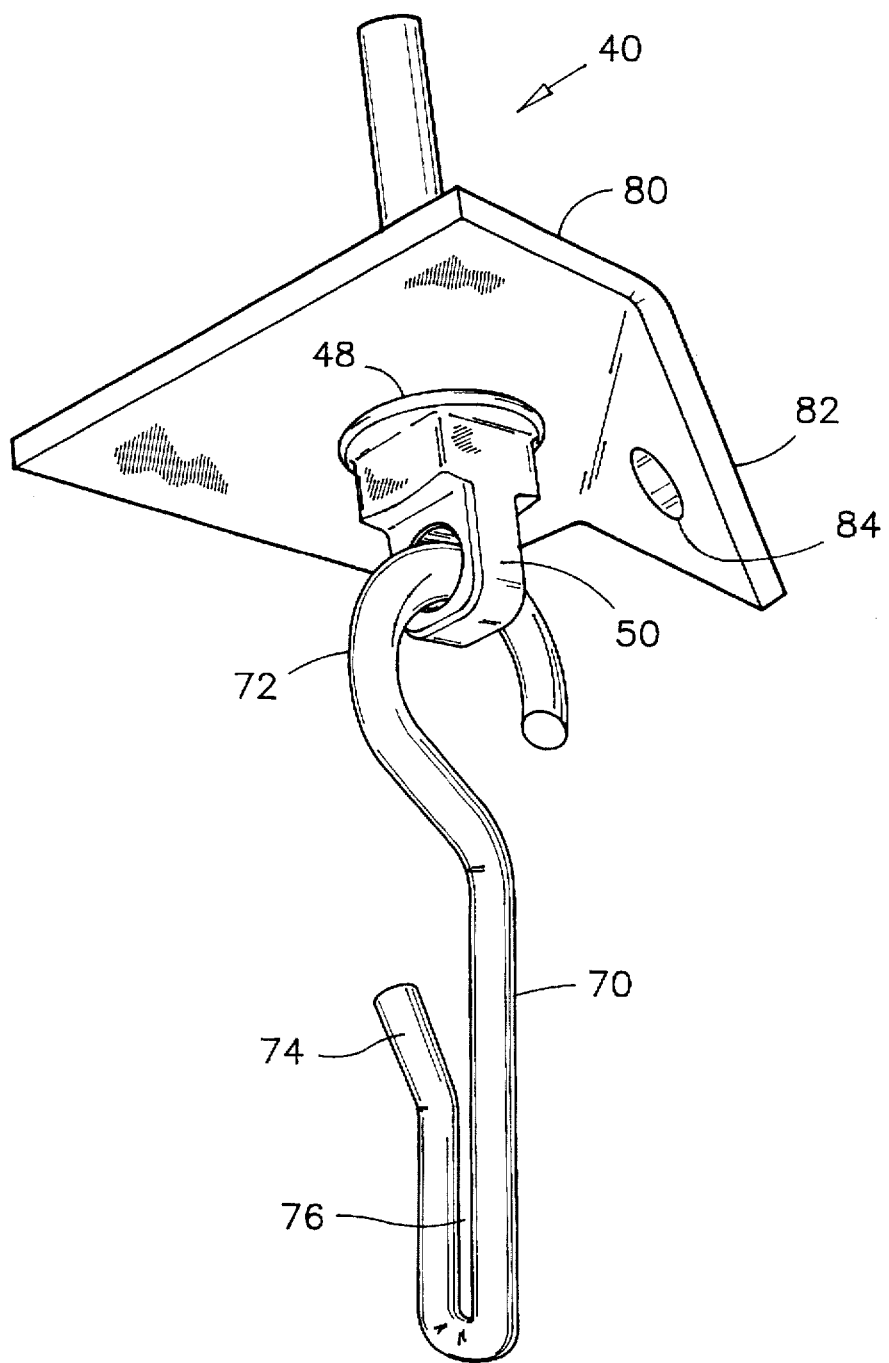
FIG. 9 is a perspective side and lower end view of the anchor eye-bolt of the first preferred embodiment with a tension washer and a J-type hanger attached to the eyed projection thereof.

Referring now to FIG. 9, another aspect of the present invention comprises an anchor eye-bolt 40, and a J-type hanger 70 having a rounded hook portion 72 mounted in hole 52 of projection 50. The lower portion of this J-type hanger 70 has a conventional form with a branch portion 74 defining a slot 76 for receiving a tie wire, or one or more links of a chain on top of one-another.

In yet another aspect of the present invention, a tension washer 80 is mounted adjacent the compression bearing surface 48 of an anchor eye-bolt 40 when, for example, this eye-bolt 40 is used in pair with another anchor eye-bolt 40 for supporting an horizontal chord member (not shown). The tension washer 80 is preferably a square or rectangular washer having a bent corner 82 and a hole 84 through that bent corner 82 for receiving a shackle (not shown) of the chord member. The bent corner 82 may be oriented in any direction along the roof of the mine regardless of the orientation of the eyed projection 50. Thus the projection 50 does not have to be rotated to correspond to an alignment of the chord member. That is to say that the compressive strength of the anchor eye-bolt 40 is not affected by the orientation of the chord member.

Moreover, the tension washer 80 thus described is economical to manufacture from a flat strip of metal using an iron worker common to the metal working industry.

Figure 10:
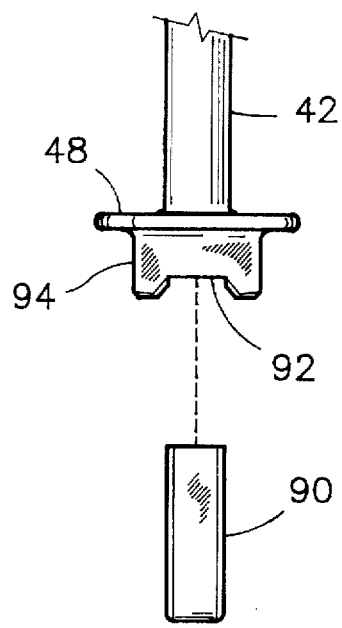
FIG. 10 illustrates the assembly of an anchor eye-bolt of a second preferred embodiment.
Figure 11:
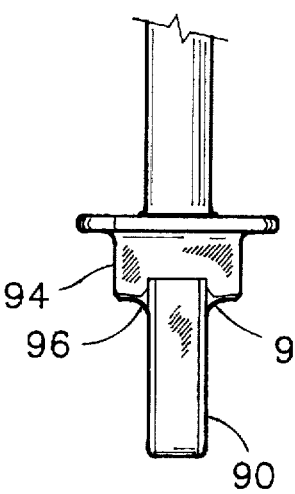
FIG. 11 is a first side view of the anchor eye-bolt of the second preferred embodiment.
Figure 12:
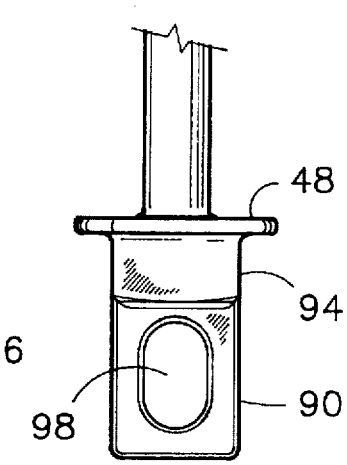
FIG. 12 is a second side view of the anchor eye-bolt of the second preferred embodiment illustrating an oblong aperture in the eyed tab thereof.
Figure 13:
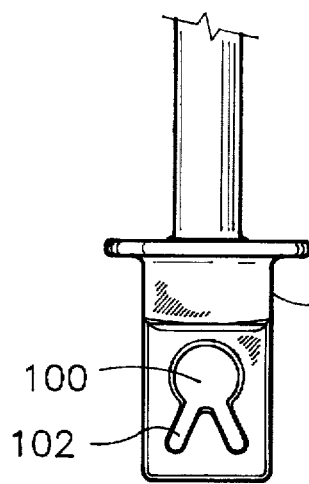
FIG. 13 is also a second side view of the anchor eye-bolt of the second preferred embodiment illustrating a hole with radial slots in the eyed tab thereof.
Figure 14:
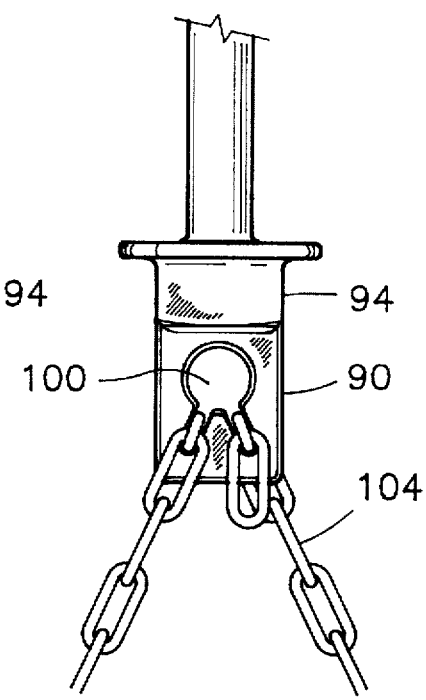
FIG. 14 is the second side view of the anchor eye-bolt of FIG. 13, with a chain anchored to the eyed tab.

Referring now to FIGS. 10, 11 and 12, a second preferred embodiment of the present invention is a fabricated anchor eye-bolt 40. The bolt head 94, and the circular pressure bearing surface 48 are firstly formed in an upsetting press. A groove 92 is preferably formed in the bolt head 94 during the upsetting process. Secondly, a tab 90 is machined and welded into the groove 92. The groove 92 is preferably a flared groove such that welds 96 have a good penetration into the head 94 and tab 90.

This method of fabricating an eye-bolt of the present invention is especially appropriate where the shank of the anchor eye-bolt 40 is too small to allow the forming of a completed head 46, pressure bearing surface 48 and projection 50 in a single upsetting process.

Therefore, a first advantage of an upsetting/fabrication process is firstly that a fair size head 94 and eyed tab 90 can be formed on relatively small bolt stock. Secondly, the eyed tab 90 can be made longer than the projection 50 as previously described, to accommodate an oblong hole 98 for example. Similarly, in another example the longer eyed tab 90 has a hole 100 with radial slots 102 for use in replacement to a J-hook 24 of the prior art for anchoring both ends of a chain 104 supporting mine installation.

While the above description provides a full and complete disclosure of the preferred embodiments of this invention, various modifications, alternate constructions and equivalents may be employed without departing from the true spirit and scope of the invention. Such changes might involve alternate, components, structural arrangements, sizes, operational features or the like. Therefore the above description and accompanying illustrations should not be construed as limiting the scope of the invention which is defined by the appended claims.

I claim:

1. An anchor eye-bolt for use in supporting mechanical equipment under a mine roof, said anchor eye-bolt comprising:

an elongated stem having a threaded portion on a first end thereof for engagement into an anchoring shell, and a bolt head integrally forming a second end thereof, said bolt head having standard dimensions relative to a diameter of said elongated stem, said bolt head also having a pressure bearing surface on a first side thereof adjoining said stem, and an eyed projection extending axially relative to said stem from a second side of said bolt head opposite said first side, said eyed projection having a circular opening therein with two radial slots extending from said circular opening and away from said bolt head;

such that said anchor eye-bolt is usable for compressing a roof strata of said mine roof and said circular opening with said two radial slots are usable for anchoring both ends of a chain for supporting said mechanical equipment.

2. An anchor eye-bolt as claimed in claim 1 wherein said eyed projection has width and thickness individually equal or smaller than an across-flat dimension of said bolt head, whereby said anchor eye-bolt is drivable by a socket of a mine power tool having nominal cross-section dimensions of said bolt bead.

3. An anchor eye-bolt as claimed in claim 2 wherein said eyed projection is a generally rectangular box-like projection having a thickness substantially a same dimension as a diameter of said stem, whereby said bolt head and said eyed projection are formable by a single hot electro-upsetting metal forming process.

4. An anchor e ye-bolt as claimed in claim 2 wherein said bolt head is a square block having a thickness of about 0.600" and a side dimension of about 1.100" such that said bolt head has an effective engagement into said drive socket of a mine power tool, affording little slipping therefrom.

5. An anchor eye-bolt as claimed in claim 1 wherein said bolt head has a flared groove on a top surface thereof, and said eyed tab is welded into said flared groove such that welds used for joining said eyed projection to said bolt head have a good penetration into said bolt head.

6. An anchor eye-bolt as claimed in claim 1, wherein said pressure bearing surface is circular and has a diameter of at least an across-corner dimension of said bolt head whereby during use thereof, said elongated stem is stretchable through said mine roof for reinforcing said mine roof about a hole receiving said anchor eye-bolt.

* * * * *